Fig. 2

United States Patent Office 3,029,021
Patented Apr. 10, 1962

3,029,021
CARD PROCESSING APPARATUS
Eric Azari, Pacific Palisades, Alfred E. Gray, Culver City, Herman J. Malin, Los Angeles, Alfred M. Nelson, Torrance, and Harold B. Thompson, Playa Del Rey, Calif., assignors to The Magnavox Company, Los Angeles, Calif., a corporation of Delaware
Filed Oct. 4, 1957, Ser. No. 688,202
17 Claims. (Cl. 235—61.11)

The invention relates to apparatus for processing information storage cards and more particularly to transducing apparatus for recording information on the individual cards and for sensing information already recorded on the cards.

A large number of computers and data processing systems have been built in recent years which use digital techniques for solving complex mathematical problems and for aiding in carrying out complicated business routines. In one particular type of data processing system, digital data relating to the different items of the particular business using the system is stored on a multiplicity of different storage cards. In the more complex systems, the individual bits of stored data can run into the millions. This requires many thousands of cards to perform the required function of the processing system. Because of the large number of cards involved, problems have arisen in the past in the handling of the cards and in the programing and transducement of data to and from individual ones of the cards.

A system has been devised, however, in which many of the problems encountered in the art have been solved to a large extent. This system uses in one particular embodiment a plurality of vacuum pressure rotatable drums to serve as a transporting and handling means for the cards. These drums carry the cards on their peripheral surfaces from one or more input stations past various reading stations so that the data on the cards can be sensed or new data recorded. The drums then serve to return the cards to the input stations or to separate output stations.

In the presently preferred embodiment of the system and apparatus described in the preceding paragraph, the data is recorded on each card in digital form and as discrete magnetic areas. A magnetic area of one polarity, for example, represents a binary zero, while that of the opposite polarity represents a binary one. Each such bit of information by itself or in combination with other bits represents information in binary form. This information may relate to numbers, alphabetical letters, or combinations of numbers and letters in accordance with known alpha-numeric coding processes. The bits of information may be disposed in rows and columns on one or both faces of each card. Each such column may represent a different "position" on each card. Although magnetic bits are preferably used, other types of storage may be used, such as punched holes or photographic representations.

The combination of the present invention is intended primarily for use in the vacuum drum apparatus and system described immediately above. The invention is concerned with a reading or writing station at which the cards are transported past a transducing means. This transducing means, may for example, comprise a plurality of electromagnetic transducing heads. Each one of the heads may be positioned to process a different row of binary data on each of the cards transported past it by the transporting drum.

As will be seen, it is most desirable that the transducing heads be positioned as close to the transporting drum as possible so that their sensing faces may be brought into intimate contact with the various bits of data on the cards. However, this has created problems in the prior art type of apparatus due to mechanical tolerances. For example, even slight eccentricities of the transporting drum produce relatively wide variations between the periphery of the drum and a stationary transducing means. This has required that the transducing means be placed a relatively large distance from the periphery of the drum in the prior art apparatus. However, this relatively large spacing between the transducing means and the drum has created problems in the production of clear and well-defined signals in the transducement of data to and from the individual cards.

Attempts have been made in the past to move the cards away from the transporting drum at the reading or writing station and into intimate contact with the sensing face of the transducing means. When such techniques are used, the transducing means itself may be placed a relatively large distance from the periphery of the transporting drum so that mechanical tolerances are no longer a problem. In one system of this type, which has met with considerable success, the movement of the cards at the reading station away from the periphery of the drum and into intimate contact with the sensing face of the transducing means has been accomplished by the provision of a stationary arcuate guide at the reading station. This guide is bulged outwardly from the periphery of the drum at its intermediate portion so that cards transported on the drum are caused to ride up and over the guide away from the peripheral surface of the transporting drum, and to return subsequently to the peripheral surface. Vacuum pressure has been provided in the transducing means for drawing the cards into intimate contact with the sensing face of the transducing means. This system, is disclosed and claimed in co-pending application Ser. No. 550,296, filed December 1, 1955, by Alfred M. Nelson and Jerome B. Wiener.

The present invention solves the problems discussed above. The present invention is further advantageous in that it is able to occupy less space than the transducing heads of the prior art and is able to operate efficiently in the minimum space. This is accomplished in part by the provision of means at the reading station for producing a cushion of air pressure between the cards and the peripheral surface of the transporting drum. The cards in effect ride up over this air cushion away from the peripheral surface of the vacuum pressure transporting drum and into intimate contact with the sensing face of the transducing means. This enables the transducing means to be spaced a reasonable distance from the surface of the transporting drum.

A pair of radially-spaced arcuate-shaped guide members may be provided at the reading station, in accordance with the invention. One of the guide members is placed adjacent the periphery of the transporting drum, and these guide members define a passage between them. This passage leads the cards away from the periphery of the transporting drum and into close proximity with the sensing face of the transducing means. The passage then leads the cards back to the drum. The cushion of pressurized air, or other fluid, referred to above can be conveniently created in this passage by providing a tubular element which extends through the table top supporting the assembly and which has orifices directed through a slot in the guide member adjacent the transporting drum. This tubular member can be conveniently supported in a rigid manner by the table top, and it can be shaped and positioned so as to be a practical source for the air cushion even in systems and apparatus in which space is at a premium. The pressure through the tubular element can be regulated so that the cards pass through the passage without being slowed down and the resulting air cushion biases the cards into line contact against the transducing means without lost motion.

Figure 1:
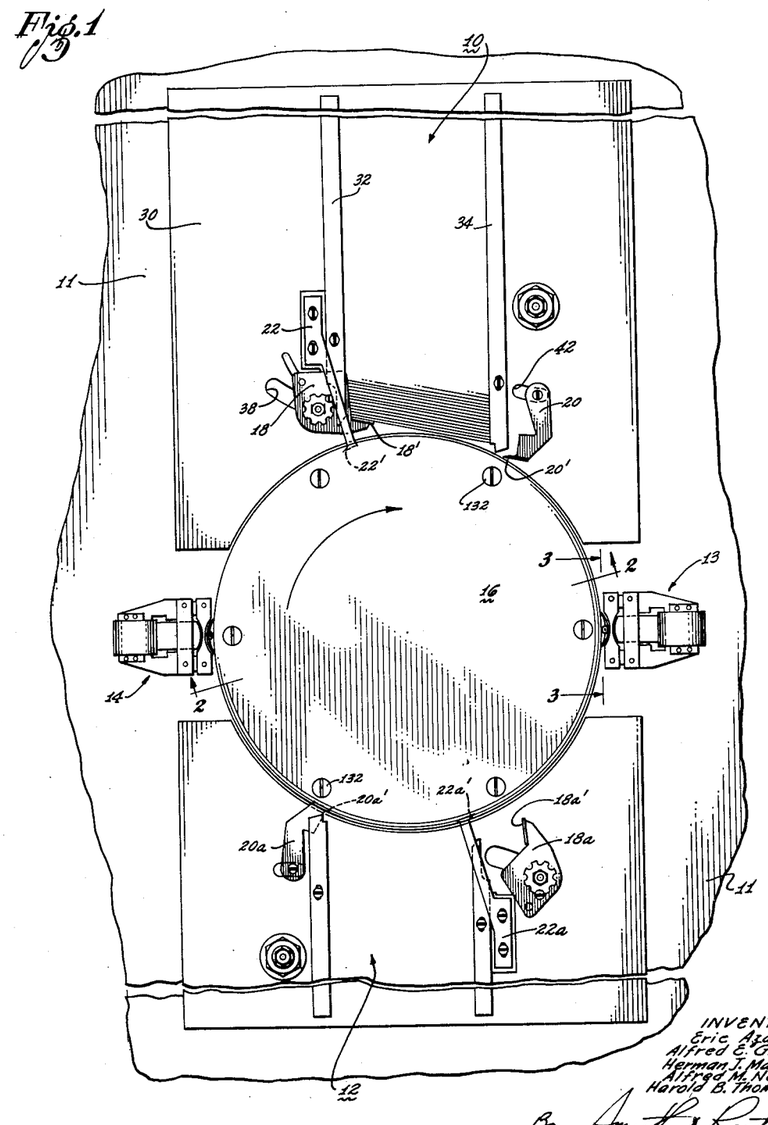
FIGURE 1 is a top plan view of a simplified data processing system utilizing one embodiment of the combination of the invention at each of its two reading or writing stations, this view illustrating in somewhat schematic form a pair of reversible feeding-stacking stations disposed adjacent a rotatable transporting drum and adapted to feed information storage cards to and receive information storage cards from the drum, which cards are processed by the transducing means at the reading stations.

A first card holder station 10 is mounted on the table top adjacent the peripheral surface of the drum 16. A second card holder station 12 is also mounted on the table top 11, and the second card holder is positioned adjacent the peripheral surface of the drum and diametrically opposite to the card holder station 10. It will be appreciated that the cards disposed in the stations 10 and 12 may be any type of discrete elements which are capable of storing information on subsequent elements of such stored information.

A first reading or writing station constructed in accordance with one embodiment of the invention is mounted on the table top 11 and is provided with transducing means 13. This first station is positioned between the card holders 10 and 12. A second reading or writing station also constructed in accordance with one embodiment of the invention, is mounted on the table top 11 and is provided with transducing means 14. This second station is positioned on the opposite side of the drum 16 from the first reading station.

Each of the card holder stations 10 and 12 may have a reversible mechanism associated with it. These reversible mechanisms may be constructed in a manner similar to those disclosed in copending application Ser. No. 645,639, Patent No. 2,969,979, which was filed March 12, 1957, in the names of Alfred M. Nelson and Allan Orner.

Briefly, the card holder station 10, for example, has a vacuum pressure feed head 18 pivotally mounted adjacent its leading wall 32. This station also has a stack head 20 which is pivotally mounted adjacent its trailing wall 34. The construction and operation of the feed head 18 and of the stack head 20 are described in detail in the copending application referred to above.

Since the stations 10 and 12 themselves, and their reversible mechanisms, form no part of the present invention, it is believed unnecessary to incorporate a full description of the mechanisms in the present specification. However, it should be pointed out that the feed head 18 is controlled to exert a vacuum pressure at its surface 18' when it is in its operative position. This vacuum pressure is exerted on the trailing portion of the leading card in the station 10. The same leading card rests on the peripheral surface of the drum 16, and the drum also exerts a vacuum pressure on the card. The other cards in the station, as illustrated, are held in stacked condition behind this leading card between the walls 32 and 34 and with their lower edges resting on the floor 30 of the station. This floor 30 is supported on the table top 11.

The station 10 is illustrated in FIGURE 1 as being in a feeding mode or condition. In this condition, the feed head 18 is moved forward in a slot 38 so that its face 18' extends into the station to engage the leading card in the manner described. The stack head 20 is, at this time, pivoted back in its slot 42 to a stand-by position.

The force exerted by the drum 16 tends to withdraw the leading card from the station 10, whereas the force exerted by the feed head 18 at its face 18' tends to retain that card in the station. The force exerted on the card by the feed head 18 is made greater than that exerted by the drum 16, so that the feed head is able to overcome the force exerted by the drum. So long as the leading card is held in this manner in the station 10, the other cards supported in stacked relationship in the station are also held in the station.

Whenever the vacuum pressure of the feed head 18 is momentarily interrupted, the leading card in the station 10 is withdrawn by the drum 16. The interval of interruption in the vacuum pressure to the feed head 18 is usually made of such a duration that only one card is released from the station to the periphery of the drum 16. The next card in the station now comes into position, and it is retained in the station until the next interruption of the vacuum pressure to the feed head 18.

In a second operational mode of the reversible station 10, the feed head 18 is withdrawn in its slot 38 back to a stand-by position, and its vacuum pressure is turned off. The stack head 20 is simultaneously moved forward in its slot 42 to its operative position. The stack head has a pair of guide fingers 20' which engage peripheral grooves in the drum 16 to assure intimate contact between the stack head and the drum when the stack head is in its operative position. When the apparatus is in this latter operational mode, any card transported by the drum rides over the guide fingers 20' and is arrested by the stack head 20.

A stationary pickoff member 22 extends diagonally across the leading wall of the card holder 10, and this pickoff member has a series of fingers 22' which extend into the peripheral grooves of the drum 16. These fingers are humped radially outwardly so that the cards transported by the drum 16 ride over the fingers and are lifted outwardly from the periphery of the drum. Therefore, a card arrested by the stack head 20 has its trailing edge projecting over the fingers 22' and displaced from the periphery of the drum. The second card transported by the drum 16 rides over the fingers 22' and under the preceding card so as to pry the preceding card from the periphery of the drum. The second card is also stopped by the stack head 20 and the preceding card is deposited in the station 10. In this manner, the apparatus is conditioned so that cards transported by the drum are stacked in the station 10.

Therefore, the dual feeding-stacking station 10 described above has two operational modes. In a first mode, cards are held in stacked relationship in the station, and such cards may be controllably and successively fed to the peripheral surface of the transport drum 16 as a result of the operation of the feed head 18. In the second operational mode, cards transported by the periphery of the drum 16 are stripped from that periphery and are deposited in the card holder 10.

The card holder station 12 has a feed head 18a associated with its leading wall and a stack head 20a associated with its trailing wall. The station 12 also has a pickoff member 22a mounted adjacent the feed head 18a. The feed head 18a and the stack head 20a may be similar in their construction and operation to the corresponding feed head 18 and stack head 20 associated with the station 10. Likewise, the pickoff member 22a may be similar in its construction to the pickoff member 22.

The manner of controlling the feed heads and stack heads to condition the stations 10 and 12 to their feeding modes and to their stacking modes are fully described in copending application Ser. No. 645,639 referred to above.

In one mode of operation, the station 10 may contain a plurality of information storage cards in stacked relationship. In that mode of operation, the reversible mechanism associated with the station 10 may be conditioned for feeding the cards to the drum 16. The station 12 may be empty and its reversible mechanism may be conditioned to deposit cards into the card holder. In this mode of operation, the cards from the station 10 may be controllably fed in succession to the transport drum 16 and carried by that drum past the reading station including the transducing means 13. After the processing of the cards by the transducing means 13, the cards may be deposited in the station 12.

At the completion of the processing operation, the operational modes of both the stations 10 and 12 may be reversed so that the cards may be returned by the drum 16 in their original order to the station 10. The cards may be further processed at the reading station of the transducing means 14 as they are being returned to the station 10.

The system of FIGURE 1 is, of course, intended merely to illustrate an operational application of the reading station assembly of the present invention. This assembly itself will find wide utility in most, if not all, types of data processing systems and apparatus for handling information storage cards and in which mechanical tolerance problems arise.

The rotatable drum 16 may be constructed in any suitable manner. For example, it may be similar in its construction to the transport drum disclosed and claimed in copending application Ser. No. 600,975, Patent No. 2,883,189, which was filed July 30, 1956, in the name of Loren R. Wilson. The details of the transport drum illustrated in FIGURE 2 are similar to the embodiment of the drum disclosed and claimed in the Wilson application.

Figure 2:
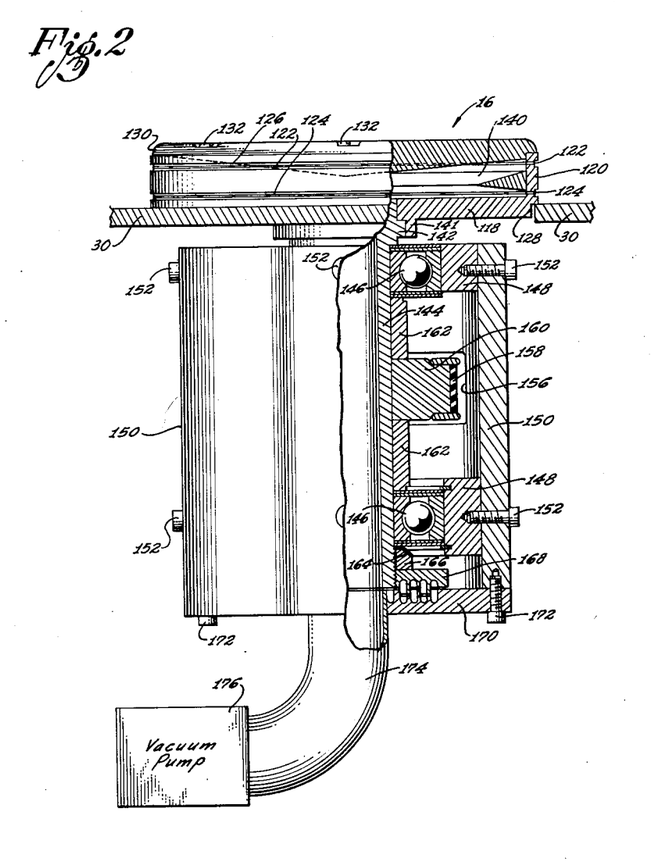
FIGURE 2 is a sectional view, substantially on the line 2—2 of FIGURE 1, illustrating the mechanical details of the rotatable transporting drum of FIGURE 1 and the manner in which a vacuum pressure is provided at the periphery of that drum for holding the cards securely on the periphery to permit them to be carried from one station to another in the system.

As shown in FIGURE 2, the drum 16 has a lower section and an upper section. The lower section of the drum includes a disk-like bottom portion 118 and an integral annular side portion 120. A pair of axially spaced peripheral orifices 122 and 124 extend through the side portion 120. Each of these orifices has an external groove associated with it, these grooves having been mentioned earlier and which function to receive the fingers 22' of the pickoff member 22 and the fingers 20' of the stack head 20.

The peripheral orifices are discontinuous in that they are interrupted at selected intervals by a series of ribs 126 which are integral with the side portion 120.

The disk-like bottom portion 118 of the lower section is undercut, as shown at 128. This enables the floor 30 of the station 10, for example, to extend beyond the outer limits of the side portion 120, so that the portion 120 overlaps the floor in the illustrated manner.

The upper section of the drum 16 is in the form of a disk-like member 130 which engages the annular side member 120 of the lower section. The upper section 130 forms an enclosure with the lower section of the drum, with the upper section being parallel to the disk-shaped bottom portion 118 of the lower section. The upper section 130 is held in place on the side portion 120 by a plurality of screws 132.

When one of the information storage cards is fed from the station 10 to the drum 16, it is held by vacuum pressure on the outer peripheral surface of the side portion 120, as will be described.

A deflector ring 140 is supported within the interior of the drum 16 in press-fit with the inner surface of the annular side portion 120. This deflector ring is tapered toward the center of the drum to provide a smooth streamlined path for air that is drawn in through the orifices 122 and 124. The under surface of the upper section 130 is bulged toward the center of the section so as to have a convex shape. This convex shape also cooperates with the deflector ring 140 in providing a smooth path for the air drawn in through the orifices 122 and 124.

The portion 118 of the lower section of the drum 16 has an annular sleeve 141 which extends downwardly from the portion 118. The sleeve 141 fits in friction-fit over a collar 142 provided at one end of a hollow shaft 144. Therefore, rotation of the hollow shaft 144 causes the drum 16 to rotate. Also, the interior of the shaft 144 communicates with the interior of the drum.

Bearings 146 are provided at opposite ends of the shaft 144. The inner races of the bearings 146 are mounted on the shaft 144, and the outer races of the bearings are disposed against bushings 148 secured to a housing 150 by a plurality of studs 152. An arcuate opening 156 is provided in the housing 150 between the bearings 146. This opening enables a drive belt 158 to extend into the housing and around a pulley 160. The pulley 160 is affixed to the shaft 144 between the bearings 146 and is held against axial movement by sleeves 162 positioned on the shaft between the bearings and the pulley. In this manner, the shaft 144 and the drum 16 can be rotated by a suitable motor (not shown) coupled to the pulley 160 by the drive belt 158.

The bearings 146 and the sleeves 162 are held on the shaft 144 by a nut 166. The nut 166 is screwed on a threaded portion at the bottom of the shaft and is maintained in fixed position on the shaft by a lock washer 164. A sealing disk 168 is also screwed on the threaded portion at the bottom of the shaft 144. The sealing disk 168 operates in conjunction with a bottom plate 170 to inhibit the movement of air between the interior of the housing 150 and the interior of the hollow shaft 144 when a difference of pressure exists between the housing and the shaft.

The bottom plate 170 is secured to the housing 150 by a plurality of studs 172, and the bottom plate is provided with a central opening. A hollow conduit 174 extends into the opening in friction-fit with the plate 170. The conduit 174 is axially aligned with the hollow shaft 144 so that air may be exhausted from the hollow interiors of the shaft and the conduit by a vacuum pump 176. The vacuum pump may be of any suitable known construction and for that reason is shown in block form in FIGURE 2.

The vacuum pump 176 draws air in through the orifices 122 and 124 and through the interior of the drum 16 down the shaft 144 and through the conduit 174. This creates a vacuum pressure at the outer peripheral surface of the annular portion 120 of the lower section of the drum 16. The deflector ring 140 and the convex underside of the disk-like upper section 130 assures that the air will flow smoothly and with a minimum of turbulence. This provides a high and adequate vacuum pressure around the outer peripheral surface of the annular side portion 120 to firmly retain the cards on that surface.

As noted above, the present invention is concerned with the assembly constituting the reading stations of the system of FIGURE 1. Both these reading stations may be similar in their construction, and for that reason only the station incorporating the transducing means 13 will be described. The various elements comprising the reading station are shown in detail in FIGURES 3 to 7, inclusive. As noted above, the transducing means 13 may be a single electro-magnetic transducer head. Alternately, the transducing means may comprise a plurality of individual electro-magnetic transducer heads, with each head being adapted to process a different row on each of the cards carried past the heads by the drum 16.

Figure 4:
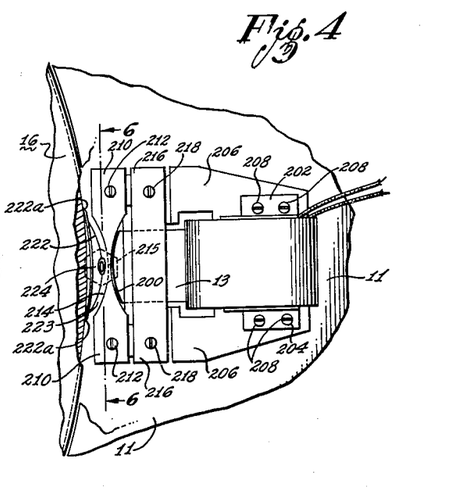
FIGURE 4 is a fragmentary top plan view showing on an enlarged scale and in more detail the various components which make up one of the reading stations shown in FIGURE 1.
Figure 5:
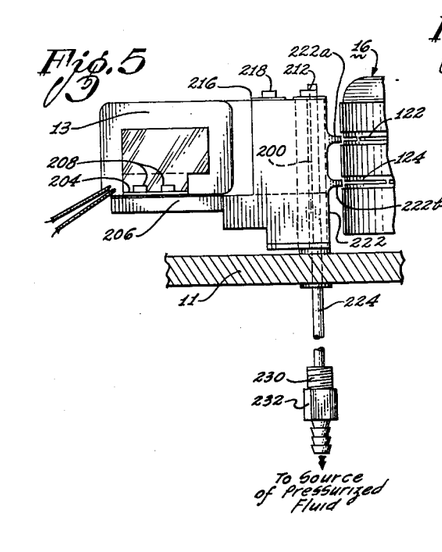
FIGURE 5 is a fragmentary side elevational view of the apparatus showing details of the assembly at one of the reading stations, this view illustrating particularly the manner in which the transducing head is supported at the station and the manner in which the ends of the innermost arcuate-shaped guide member extend into peripheral grooves in the transporting drum.
Figure 7:
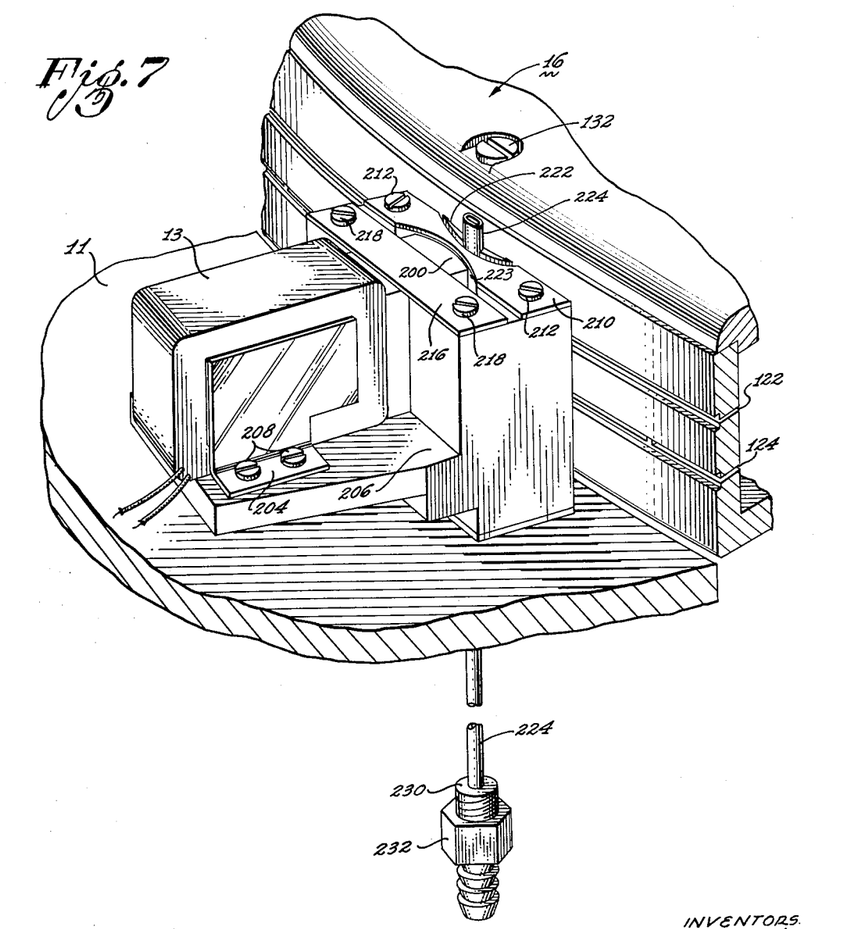
FIGURE 7 is a perspective view of the reading station assembly of the invention pictorially illustrating the relation between the various elements of the combination.

The transducing means 13 is illustrated in FIGURES 4, 5 and 7 as an electro-magnetic transducer head having an arcuate-shaped sensing face 200. This head includes a pair of mounting brackets 202 and 204, and these mounting brackets are fastened to a supporting bracket 206 by means of a plurality of screws 208. The screws 208 extend through the mounting brackets 202 and 204 and into threaded engagement with aligned holes in the bracket 206. A guide member 210 is supported on the bracket 206 by means of a pair of screws 212. These latter screws extend through the guide member 210 and into the supporting bracket 206 in threaded engagement with the bracket. The guide member 210 has a two-faced arcuate-shaped central portion 214, and the transducer head 13 is supported on the bracket 206 with its sensing face 200 disposed against the arcuate-shaped portion 214 of the guide member 210. The guide member 210 has a slot 215 extending axially across its central arcuate-shaped portion 214, and this slot exposes a portion of the sensing face 200 of the transducer head 13. A supporting strip 216 is secured to the bracket 206 by a pair of screws 218, this strip assisting in holding the transducer head 13 rigidly in position with its sensing face 200 against the inner face of the arcuate portion 214 of the guide member 210.

Figure 3:
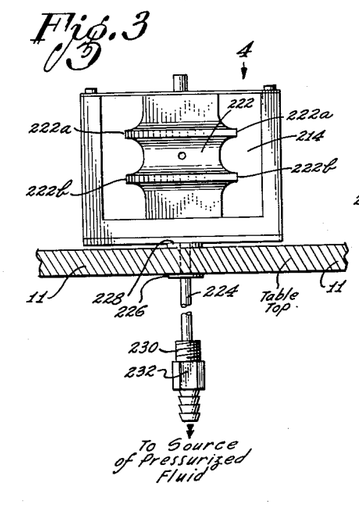
FIGURE 3 is a view substantially on the line 3—3 of FIGURE 1 and showing the guide members which assist to move the cards outwardly from the periphery of the drum and into intimate line contact with a face on the transducing means which is spaced from the periphery, this view also showing the means by which pressurized fluid is introduced into the assembly to create an air cushion that causes the cards to be moved against the face of the transducing means.

As best illustrated in FIGURE 4, the transporting drum 16 is disposed adjacent the guide member 210, and the outer face of the arcuate-shaped portion 214 is spaced from and follows the contour of the periphery of the drum 16 to some extent. A second arcuate-shaped guide member 222 is disposed between the arcuate-shaped portion 220 of the guide member 210 and the drum 16. The arcuate-shaped guide member 222 has a central portion which is bulged outwardly from the periphery of the drum, and it has end portions which extend into the grooves adjacent the peripheral slots 122 and 124 of the drum, these end portions being in the form of a pair of fingers 222a and 222b, as best shown in FIGURES 3 and 5.

As a card transported on the periphery of the drum 16 reaches the arcuate guide member 222 whose ends, as noted above, extend into the peripheral grooves of the drum, the card becomes lifted by the guide member 222 and is moved outwardly from the periphery of the drum. The card then moves on the guide member 222 to a position approaching the sensing face of the transducer head 13. Because of the bulged configuration of the guide member 222, the card becomes positioned in contiguous relationship with the sensing face of the transducing means 13 during its movement along the guide. The guide 222 defines a passageway 223 with the outer face of the arcuate-shaped portion 214 of the guide member 210, and the card is moved through the passageway 223 as it is transported on the drum 16 past the reading station. The guide member 222 serves to withdraw each card from the periphery of the drum for movement through the passageway and to return the cards to the drum after movement past the transducing head.

The length of the guide member 222 is made less than that of the card. This permits the drum to move the card along the guide member and back to the drum as a result of the vacuum pressure at the periphery of the drum. In this way, vacuum pressure is exerted by the drum against the card regardless of the positioning of the card relative to the guide member and the drum so as to produce a movement of the card with the drum.

A tubular element 224 (FIGURES 3, 5 and 6) extends upwardly through the table top 11, and this tubular element may be supported rigidly by the table top by means of a pair of threaded fittings 226 and 228. The tubular element 224 has a threaded lower end portion 230, and this threaded end portion has a nipple 232 screwed to it. The nipple 232 is shaped to receive a rubber hose connection which extends to a suitable source of pressurized fluid. This fluid may conveniently be air under pressure.

Figure 6:
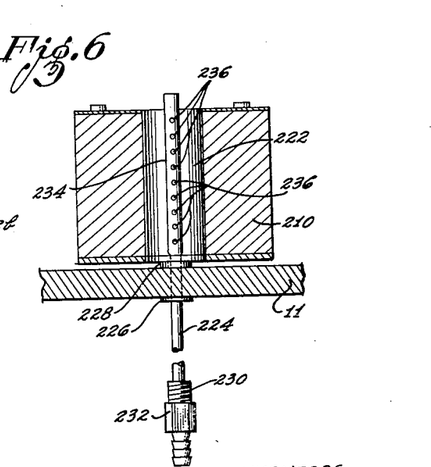
FIGURE 6 is a view taken along the line 6—6 of FIGURE 4 to show the manner in which a tubular element extends through the table top and has a series of orifices directed through a slot in one of the guide members so that pressurized streams of fluid may be directed to the cards transported past the reading station to move the cards into close line contact with the transducing means.

The arcuate-shaped guide member 222 has a central slot extending across its surface and facing the slot 215 in the guide member 210, this slot being indicated at 234 in FIGURE 6. The tubular member 224 is disposed within the slot 234 such that it may be considered as extending through the guide member 222. Actually, the tubular member 224 may be attached to the guide member 222 so as to be considered as forming a part of the guide member.

The tubular member 224 is provided with a plurality of spaced orifices 236. These orifices are directed toward the slot 215 in the arcuate-shaped member in the guide member 210. Any suitable valve means (not shown) may be provided for controlling the flow of pressurized fluid through the tubular member 224. This flow results in streams of fluid from the orifices 236, and these streams provide an air cushion for each card as the card is moved through the passageway between the guide member 222 and the guide member 210.

Since the orifices 236 in the member 224 are relatively small, the fluid passes through the orifices at a high velocity and impinges on the card with a relatively large force. This causes the card transported through the passageway 223 to be moved against the face of the guide member 210. Therefore, the card is pressed against the slot 215 in the guide member and against the sensing face 200 of the transducer head 13. The dimensions of the arcuate-shaped portion 214 of the guide member 210 are made such that the air pressure within the passageway 223 causes each card to move into a line contact with the sensing face 200 of the transducer head 13. This line contact extends transversely across each card, and sweeps the card from its leading to its trailing edge as the same is moved past the slot 215.

Since each card becomes disposed in contiguous relationship to the transducer head 13 as it is moved through the passageway 223 between the guide members 210 and 222, an optimum transducing action is obtained between the cards and the head. For example, a relatively large magnetic recording flux is able to thread the card being processed and ensure the proper production of magnetic signals on the card in accordance with the introduction of electrical signals to the transducer head 13. The optimum transducing action is obtained regardless of variations in card thickness and imperfections in the contour of the drum. These drum imperfections, as noted above, may result from drum eccentricities which produce variations in the drum from a true cylindrical shape, and which cause the drum periphery to move in a radial direction as the drum rotates.

The optimum transducing action is obtained by the transducer head 13 because the cards leave the drum 16 at the time the transducing action is about to take place and the cards are led along an independent passageway 223 into intimate contact with the sensing face 200 of the transducer 213.

A similar transducing action occurs, when the sensing face 200 of the transducer 13 is being used to process magnetic areas on the cards to obtain electric signals from the transducer.

The pressure of the air or other fluid creating the cushion within the passageway 223 is appropriately adjusted so that the cards may be fed through the passageway and against the sensing face 200 of the transducing means 13 without appreciably slowing down the cards as they are passed through the passageway.

Figure 8:
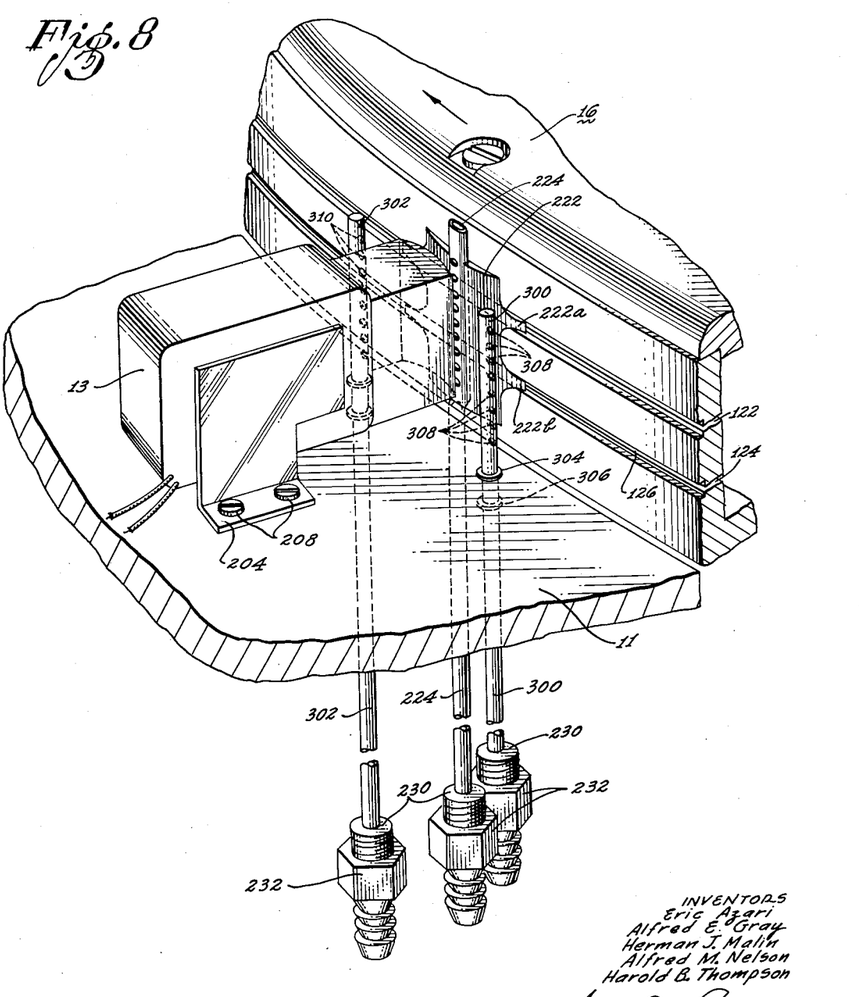
FIGURE 8 is a perspective view of a second embodiment of the reading station of the assembly of the invention in which the cards are guided to the reading head by pneumatic means.

In the embodiment illustrated in FIGURE 8, the transducing means 13 may be directly mounted on the table top 11. This may be achieved by means of its mounting brackets 202 and 204, and the screws 208, as before.

The arcuate shaped guide member 222 is mounted, as before, between the sensing face of the transducing means 13 and the peripheral surface of the drum 16. As described above, this guide member has a central portion which is bulged outwardly from the periphery of the drum and it has end portions 222a and 222b which extend into the groove on the periphery of the drum adjacent the slots 122 and 124.

The tubular element 224 is also used in the embodiment of FIGURE 8 and, as before, this element extends upwardly through the table top 11 to be disposed in the central slot in the guide member 222.

The other arcuate guide members of the previous embodiment, however, are dispensed with. Instead, a pair of tubular members 300 and 302 are mounted on the table top 11 on either side of the transducing means 13 and adjacent but spaced from the guide member 222.

The tubular members 300 and 302 extend upwardly from the table top 11. The tubular member 300 may be rigidly mounted on the table top by a pair of threaded fittings 304 and 306. The tubular member 302 may be similarly mounted on the table top.

The tubular member 300 has a series of orifices 308 which are directed towards the guide member 222. The tubular member 302 has a like series of orifices 310 which also are directed towards the guide member 222.

Any suitable valve means (not shown) may be provided for controlling the flow of pressurized fluid through the tubular member 300. Similar valve means may be provided for controlling the flow of pressurized fluid through the tubular member 302.

As in the previous embodiment the flow of pressurized fluid through the orifices in the tubular element 224 can be controlled to move the cards transported over the guide 222 against the face of the transducing means 13. At the same time, the flow of pressurized fluid through the orifices 308 and 310 in the tubular members 300 and 302 moves the ends of such cards towards the guide 222 to prevent the cards from being driven off the guide by the pressurized fluid from the orifices in the tubular element 224.

Therefore, as each card is transported by the drum 16 to the guide 222, such card is held against the guide by the pressurized fluid from the tubular member 300. Then the card comes under the influence of the pressurized fluid from the tubular member 224 and it is thereby urged against the sensing face of the transducing means 13 in line contact with that face, as before. Now, the leading edge of the card comes under the influence of the pressurized fluid from the tubular member 302 to be directed down against the face of the guide 222.

The tubular members 300 and 302 in the embodiment FIGURE 8, therefore, perform the function of the arcuate guides 210 of the previous embodiment, and its associated structures, in properly guiding the cards past the transducing means 13.

The embodiment of FIGURE 8 is extremely flexible in that it permits the transducing means 13 to be shifted to an optimum sensing position without the need for shifting the associated guiding means. The cards themselves can be accurately and precisely guided into exact line contact with the transducing means without loss in speed merely by independently adjusting the pressures of the fluid fed to the three tubular members 224, 300 and 302.

The invention provides, therefore, an improved assembly for use as a reading or recording station in a data processing system and apparatus, or the like. This station permits cards to be withdrawn from the periphery of the transporting means and brought through an independent passage into intimate contact with the sensing face of a transducing means. As noted above, the assembly permits the efficient reading and recording of data on the cards by the transducing means which is essentially independent of mechanical imperfections in the transporting drum and of variations in card thickness.

Although this application has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. In combination for use with a plurality of information storage cards for the transducement of data between the cards and an external source at a transducing station, transporting means for providing a movement of the cards past the transducing station, transducing means at the transducing station, the transducing means being constructed to provide a transducing action between the cards and the external source at a particular position, means including at least one guide element positioned between said transporting means and said transducing means and constructed to withdraw the cards from the transporting means for movement past the transducing means and to return the cards to the transporting means after movement of the cards past the transducing means, means including at least one orifice directed through said guide element and towards said transducing means and being constructed to direct pressurized fluid through the orifice only at the particular position for moving the cards into intimate relationship with the transducing means at the particular position to facilitate the transducing action by the transducing means, and means for introducing pressurized fluid through the orifice to move each card into intimate relationship with the transducing means as such card is moved over said guide element.

2. In combination for use with a plurality of information storage cards for the transducement of data between the cards and an external source at a transducing station, transporting means for providing a movement of the cards past the transducing station, transducing means at the transducing station, the transducing means being constructed to provide a transducing action at a particular position between the cards and the external source, an arcuate-shaped member contiguous at its ends to said transporting means and having an intermediate portion bulged outwardly from said transporting means, said arcuate-shaped member being constructed to withdraw cards from the transporting means for movement past the transducing means and to return the cards to the transporting means after movement of the cards past the transducing means, means including at least one orifice directed through said arcuate-shaped member and towards said transducing means and being constructed to direct pressurized fluid through the orifice only at the particular position for moving the cards into intimate relationship with the transducing means to facilitate the transducing action by the transducing means, and means for introducing pressurized fluid through the orifice to move each card into intimate relationship with the transducing means as such card is moved over said arcuate-shaped member.

3. In combination for use with a plurality of information storage cards for the transducement of data between the cards and an external source at a transducing station, means including a rotatable transporting drum for carrying cards on its peripheral surface in accordance with the rotation of the drum, transducing means at the transducing station, the transducing means being constructed to provide a transducing action between the cards and the external source at a particular position, an arcuate-shaped member contiguous at its ends to the periphery of said drum and having an intermediate portion bulged radially outwardly from said drum to withdraw cards from the periphery of said drum for movement past the transducing means and to return the cards to the drum after movement past the transducing means, means including a plurality of orifices directed through said arcuate-shaped member at the arcuate-shaped portion of the member and towards said transducing means and being constructed to direct pressurized fluid through the orifices only at the particular position for moving the cards into intimate relationship with the transducing means at the particular position to facilitate a transducing action by the transducing means, and means for introducing pressurized fluid through the orifices to move each card into intimate relationship with the transducing means at the particular position as such card is moved over said arcuate-shaped member.

4. In combination for use with a plurality of information storage cards for the transducement of data between the cards and an external source at a transducing station, a rotatable vacuum pressure transporting drum for carrying the cards on its peripheral surface past the transducing station, transducing means at the transducing station, the transducing means being constructed to provide a tranducing action between the cards and the external source at a particular position, a first arcuate-shaped guide member at the transducing station and interposed between the transducing means and the drum and spaced from the periphery of the drum, there being in said first guide member a slot at the particular position to expose the transducing means for facilitating the transducing action at the particular position, a second arcuate-shaped guide member contiguous at its ends to the periphery of said drum and having an intermediate portion bulged outwardly from said drum to define a passage with the first arcuate-shaped guide member, said second arcuate-shaped guide member being constructed and disposed to withdraw cards from the periphery of said drum for movement through such passage and to return the cards to the drum after movement past the transducing means, means including a plurality of orifices directed through said arcuate-shaped guide member at the particular position towards the slot in said first arcuate-shaped guide member and being constructed to direct pressurized fluid through the orifices only at the particular position for moving the cards into intimate relationship with the transducing means through the slot at the particular position to facilitate a transducing action by the transducing means, and means for introducing pressurized fluid through the orifices to move each card against said first arcuate-shaped member and into intimate relationship with the transducing means through the slot at the particular position as such card is moved over said second arcuate-shaped member.

5. In combination for use with a plurality of information storage cards for the transducement of data between the cards and an external source at a transducing station, a table top, a vacuum pressure transporting drum rotatably mounted on said table top for carrying the cards on its peripheral surface past the transducing station, transducing means at the transducing station and having an arcuate-shaped sensing face for providing a transducing action between the cards and the external source, a first arcuate-shaped guide member at the transducing station and interposed between the transducing means and the drum and spaced from the periphery of the drum, said first guide member engaging said sensing face of said transducing means and there being a slot in said first guide member to expose a portion of such face, a second arcuate-shaped guide member contiguous at its ends to the periphery of said drum and having an intermediate portion bulged outwardly from the drum and defining a passage with the first guide member, there being a slot in said guide member in alignment with the slot in the first guide member, said second guide member being constructed and being disposed to withdraw cards from the periphery of the drum for movement through the passage between the first and second guide members and to return the cards to the drum after movement past the sensing face of the transducing means, a tubular element extending through said table top and into said slot in said second guide member, there being in said tubular element a plurality of orifices disposed toward said slot in said first guide member to direct pressurized fluid through the orifices for moving the cards into intimate relationship with the sensing face of the transducing means at the position of the slot in the first guide member to facilitate the transducing action by the transducing means, and means for introducing pressurized fluid through the tubular member to produce streams of pressurized fluid from the orifices thereby to move each card against said first guide member and into intimate relationship with the sensing face of the transducing means through the slot in the first guide member as such card is moved over the second guide member.

6. In combination for use with a plurality of information storage cards for the transducement of data between the cards and an external source, transport means for providing a movement of the cards, guide means disposed in contiguous relationship to the transport means at opposite ends of the guide means and extending away from the transport means at intermediate positions to remove the cards from the transport means for movement along the guide means and to return the cards to the transport means after movement along the guide means, transducing means disposed in contiguous relationship to the guide means to provide a transducement between the external source and the cards moving along the guide means and constructed to provide the transducement at a particular position along the guide means, and means disposed in co-operative relationship with the guide means for directing a localized force against the cards at only the particular position along the guide means during the movement of the cards along the guide means to press the cards against the transducing means for an optimum transducing action by the transducing means at the particular position.

7. In combination for use with a plurality of information storage cards for the transducement of data between the cards and an external source, means including movable transport means for maintaining the cards in fixed position on the transport means during the movement of the transport means, a head disposed near the transport means to provide a transducement of data between the card and the external source at a particular position during the movements of the cards past the head, guide means disposed relative to the transport means and constructed to produce a movement of the cards from the transport means along the guide means and past the head and then back to the transport means, a hollow tube extending through the guide means at a position near the head, there being in the hollow tube at least one orifice facing the head to direct a localized stream of fluid under pressure toward the head only at the particular position for maintaining the cards against the head only at the particular position during the movement of the cards along the guide means, and means for directing fluid under pressure through the hollow tube during the movement of the cards along the guide means.

8. In combination for use with a plurality of information storage cards for the transducement of data between the cards and an external source, transport means movable in a closed loop and constructed to maintain the cards in fixed position on the transport means during the movement of the transport means, means including at least one guide member disposed relative to the transport means and shaped to lift the cards from the transport means for movement along the guide member and back to the transport means, a head disposed relative to the guide member and constructed to provide a transducement of data between the cards and the external source at a particular position during the movement of the cards along the guide member, a control member extending through the guide member, there being in the control member at least one orifice facing the head only at the particular position to direct fluid under pressure through the orifice for facilitating the coupling at the particular position between the cards and the external source to enhance the transducing action by the transducing means, and means for directing fluid under pressure through the control member and the orifice in the control member to press the cards against the head during the movement of the cards along the guide member to facilitate the coupling between the cards and the head for the transducement of data.

9. The combination set forth in claim 8 in which the transport means is a rotatable drum and in which the fluid-directing means includes a hollow tube for receiving fluid under pressure and in which the hollow tube has at least one orifice to direct the fluid in a jet stream toward the transducing means for a positioning of the card against the transducing means during the transducement of data.

10. In combination for use with a plurality of information storage cards for the transducement of data between the cards and an external source, transport means for the cards, transducing means positioned adjacent said transport means for providing a transducing action between the cards and the external source, first means positioned adjacent said transducing means and disposed in contiguous relationship to the transport means at the ends of the first means such that cards transported by said transport means pass between said first means and said transducing means, and means for introducing pressurized fluid to said first means at only a localized position in the path of movement of the cards between the first means and the transducing means to move each card into intimate contact with said transducing means at only such localized position as such card is transported between said first means and said transducing means.

11. In combination for use with a plurality of information storage cards for the transducement of data between the cards and an external source, transport means for the cards, transducing means positioned adjacent said transport means and constructed to provide a transducing action between the cards and the external source at a particular position, pneumatic means interposed between said transport means and said transducing means and disposed in contiguous relationship to the transport means at the ends of the pneumatic means to provide a transfer of cards from the transport means to the pneumatic means and a subsequent return of the cards from the pneumatic means to the transport means, there being in said pneumatic means at least one orifice directed towards said transducing means and constructed to introduce pressurized fluid through the orifice and against the cards at only the particular position to move the cards into intimate relationship with the transducing means at the particular position, and means coupled to the pneumatic means for introducing pressurized fluid through the orifice toward the transducing means to move each card into intimate engagement with the transducing means at the particular position as such card is moved past said pneumatic means.

12. In combination for use with a plurality of information storage cards for the transducement of data between the cards and an external source, transport means for the cards, transducing means positioned adjacent said transport means and constructed to provide a transducing action between the cards and the external source at a particular position, first means positioned in contiguous relationship to said transducing means to obtain a movement of cards past said transducing means and between the transducing means and the first means, first pneumatic means included in said first means, second pneumatic means positioned in contiguous relationship to said transport means to facilitate disposition of the cards on the first means during the movement of the cards on the first means past the transducing means and to facilitate the transfer of the cards between the transport means and the first means, and means coupled to the first pneumatic means for introducing pressurized fluid to said first pneumatic means only at the particular position to move each card into intimate relationship with the transducing means as such card is moved past said transducing means and coupled to said second pneumatic means for introducing pressurized fluid to said second pneumatic means to maintain the cards on the first means during the movement of the cards toward the transducing means.

13. In combination for use with a plurality of information storage cards for the transducement of data between the cards and an external source, transport means for the cards, transducing means constructed to provide a transducing action between the cards and the external source at a particular position during the movement of the cards past the transducing means, first means disposed in contiguous relationship to the transport means and constructed to provide a transfer of cards from the transport means to the first means and a subsequent return of the cards from the first means to the transport means, first pneumatic means included in said first means, there being in said first pneumatic means at least one orifice directed towards said transducing means and constructed to introduce pressurized fluid through the orifice and against the cards only at the particular position to move each card into intimate relationsip with the transducing means at the particular position, second pneumatic means disposed in contiguous relationship to the first means at one end of the first means for maintaining the cards on the first means during the movement of the cards along the first means to guide the cards from the first means to the transport means and having at least one orifice directed towards said first pneumatic means, and means coupled to the first pneumatic means for introducing pressurized fluid through the orifice in said first pneumatic means only at the particular position to move each card into intimate relationship with the transducing means at the particular position as such card is moved past said first pneumatic means and coupled to the second pneumatic means for introducing pressurized fluid through the orifice in said second pneumatic means to guide such card back to said transport means.

14. In combination for use with a plurality of information storage cards for the transducement of data between the cards and an external source, transport means for the cards, transducing means constructed to provide a transducing action between the cards and the external source at a particular position, first means including a first tubular element disposed in contiguous relationship to the transport means at the ends of the first means and disposed in contiguous relationship to the transducing means at a position near the tubular element, there being in said first tubular element a plurality of orifices directed towards said transducing means and constructed to introduce pressurized fluid through the orifices and against the cards only at the particular position to move each card into intimate relationship with the transducing means at the particular position, a pair of further tubular elements each disposed in contiguous relationship to the first means at a position near a different end of the first means, each of said further tubular elements having a plurality of orifices directed towards said first means, means coupled to the first tubular element for introducing pressurized fluid to said first tubular element to move each card into intimate contact with the transducing means as such card is moved past said first tubular element, and means coupled to the further tubular elements for introducing pressurized fluid to said further tubular elements to maintain the cards on the first means during the movement of the cards along the first means.

15. In combination for use with a movable medium for the transducement of data between the medium and an external source, transport means for the medium, a guide member disposed in contiguous relationship to the transport means at its ends and constructed to provide a transfer of the medium from the transport means to the guide member and to provide a subsequent return of the medium from the guide member to the transport means, transducing means disposed relative to the guide member at an intermediate position along the guide member for providing a transducing of data between the medium and the external source at a particular position during the movement of the medium past the particular position, and means coupled to the guide member for providing a flow of pressurized fluid through the guide member and against the medium only at the particular position to position the medium against the transducing means only at the particular position during the transducing action.

16. In combination for use with a medium for the transducement of data between the medium and an external source, transport means for the medium, first means positioned relative to the transport means at one end to obtain a transfer of the medium from the transport means to the first means and positioned at the other end relative to the transport means to obtain a subsequent return of the medium from the first means to the transport means, transducing means disposed relative to the first means at an intermediate position along the first means to provide at the intermediate position a transducing of data between the medium and the external source, there being at least one hole in the first means and disposed at the intermediate position in a direction to direct air under pressure against the medium only at the intermediate position to move the medium against the transducing means at the intermediate position during the movement of the medium along the first means, and means coupled to the first means for introducing air under pressure to the first means for the flow of the air through the hole in the first means.

17. The combination set forth in claim 16 in which the first means includes a hollow tube in which the hole is provided in the hollow tube and in which the transport means is movable and is constructed to obtain a movement of the medium with the transport means.

References Cited in the file of this patent

UNITED STATES PATENTS

| | | |
|---|---|---|
| 2,506,445 | Donning | May 2, 1950 |
| 2,524,029 | Carroll et al. | Oct. 3, 1950 |
| 2,752,154 | Nelson | June 26, 1956 |
| 2,792,175 | Amundsen | May 14, 1957 |